United States Patent [19]
Isaka

[11] 3,934,562
[45] Jan. 27, 1976

[54] TWO-CYCLE ENGINE

[75] Inventor: Yoshiharu Isaka, Iwata, Japan

[73] Assignee: Yamaha Hatsudoki Kabushiki Kaisha, Iwata, Japan

[22] Filed: Sept. 23, 1974

[21] Appl. No.: 508,523

[30] Foreign Application Priority Data
Sept. 26, 1973 Japan............................ 48-108191
Dec. 11, 1973 Japan............................ 48-137988

[52] U.S. Cl. ........ 123/53 BA; 123/32 ST; 123/53 B; 123/73 R; 123/75 B; 123/DIG. 4
[51] Int. Cl.² ......................................... F02B 25/12
[58] Field of Search ............ 123/51 R, 51 B, 51 BA, 123/53 R, 53 A, 53 B, 53 BA, 32 ST, 32 SP, 191 S, 191 SP, 73 R, 74 R, 75 B

[56] References Cited
UNITED STATES PATENTS
| | | | |
|---|---|---|---|
| 1,341,838 | 6/1920 | Bowden | 123/53 B |
| 1,457,322 | 6/1923 | Sproule | 123/53 BA |
| 1,645,795 | 10/1927 | Burtnett | 123/53 B |
| 2,091,413 | 8/1937 | Mallory | 123/53 A |
| 3,363,611 | 1/1968 | Von Seggern et al. | 123/73 R |

Primary Examiner—Wendell E. Burns
Assistant Examiner—David D. Reynolds
Attorney, Agent, or Firm—Spensley, Horn and Lubitz

[57] ABSTRACT

A two-cycle engine system of the crankcase precompression type comprising the combination of a first engine, a second engine and a combustion chamber provided with an ignition plug constructed in such a manner that the second engine is mounted in parallel and adjacent to the first engine with the combustion chamber interconnecting the first and second engines, whereby the construction becomes very compact. A rich air-fuel mixture is supplied into the combustion chamber through the second engine for ignition and a lean mixture (or air) is supplied into the first engine for scavenging and combustion so that the system provides a very compact design as well as a satisfactory performance in the reduction of the amount of harmful components in the exhaust gases.

18 Claims, 2 Drawing Figures

TWO-CYCLE ENGINE

BACKGROUND OF THE INVENTION

1. Field of the Invention

This invention relates to a two-cycle engine system, more particularly a two-cycle engine system of the crankcase precompression type in which a first engine, a second engine, and a combustion chamber having an ignition plug therein are provided.

2. Prior Art

It has been known that the amount of harmful components in exhaust gases from an internal combustion engine can be reduced by stratifying two types of air-fuel mixtures, rich and lean, inside the combustion chamber, and igniting the rich mixture, flames of which propagates through the lean mixture.

Regarding four-cycle engines, the prior art discloses torch ignition internal combustion system and modifications thereof which include an auxiliary chamber having an ignition plug. In such systems a nozzle may be employed for supplying a rich mixture in an auxiliary ignition chamber to avoid ignition failures. The flames of the rich mixture in the auxiliary chamber thus ignited burst into the main combustion chamber and fire the lean mixture therein. The improvements of such prior art substantially exist in the ignition process employing an auxiliary chamber (or auxiliary ignition chamber) as an efficient torch ignition device. Accordingly, a fuel injection nozzle is used to supply the rich mixture and the volume of the auxiliary chamber is small in comparison with the main combustion chamber. In fact it can be generally observed that the nozzle to inject the fuel does not guarantee a sufficient effect in the atomization and vaporization of the fuel in the auxiliary chamber, which causes failures in igniting and firing the fuel. Moreover, the construction of such a device to supply the fuel is so complicated that it requires a very high precision in manufacturing and it may lead to possible mechanical difficulties. It should be further noted that in the case of a two-cycle engine of the crankcase precompression type, the burnt gases must be scavenged with the new mixture supplied, and the unburnt fuel may blow by through the exhaust port together with the burnt gases in order to obtain a sufficient scavenge performance. Thus, the prior art devices cannot be applied to a two-cycle engine.

With respect to a tow-cycle engine, other prior art teaches that an ignition chamber with a spheroidal structure and a passage to supply a rich mixture into the ignition chamber may advantageously be employed to attain an improved ignition and combustion by inducing a toroidal flow of the rich mixture in the chamber. In accordance with this system a certain extra time elapses in the combustion stroke because of the facts that the ignition process is effected in the toroidal flow of the rich mixture prior to the main combustion and that the majority of the fuel in the combustion chamber is the lean mixture which gives a relatively slower burning velocity. Accordingly, there remain some drawbacks unsolved such as the reduction of the thermal efficiency and of the speed of revolutions causing less power and overheating.

This invention solves those problems which the devices disclosed by the prior art have failed to resolve. The combination of a first engine, a second engine and a combustion chamber has enabled the minimization of the drawbacks described above in a most compact manner.

SUMMARY OF THE INVENTION

It is an object of this invention to provide a twocycle engine system of the crankcase precompression type which provides reliable ignition and combustion to restrict the amount of harmful components in the exhaust gases to a minimum, by supplying an air or lean mixture from a first engine and a rich mixture from a second engine, separately to a combustion chamber.

It is another object of this invention to provide a two-cycle engine system of the kind set forth which is very compact in structure by arranging the second engine in parallel with the first cylinder of the first engine.

It is still another object of this invention to provide a two-cycle engine with an improved operational efficiency or a higher performance.

The novel features which are believed to be characteristic of the invention, both as to its construction and operation, together with further objects and advantages thereof, will be better understood from the following description considered in connection with the accompanying drawings in which a presently preferred embodiment of the invention are illustrated by way of example. It is to be expressly understood, however, that the drawings are for the purpose of illustration and description only and are not intended as a definition of the limits of the invention.

DETAILED DESCRIPTION OF THE INVENTION

Figure 1:
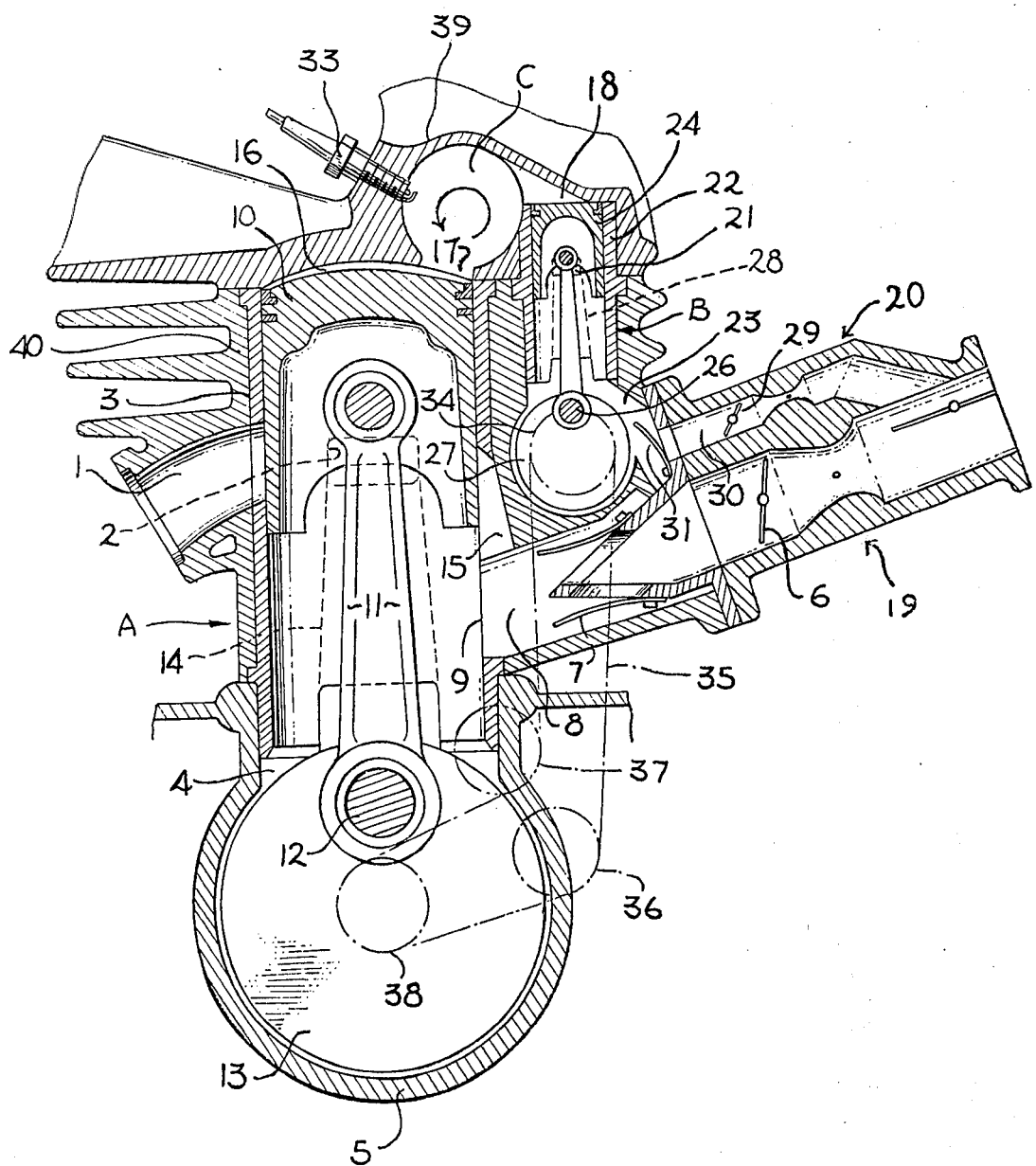
FIG. 1 shows a vertical cross-sectional view of the basic form of this invention.
Figure 2:
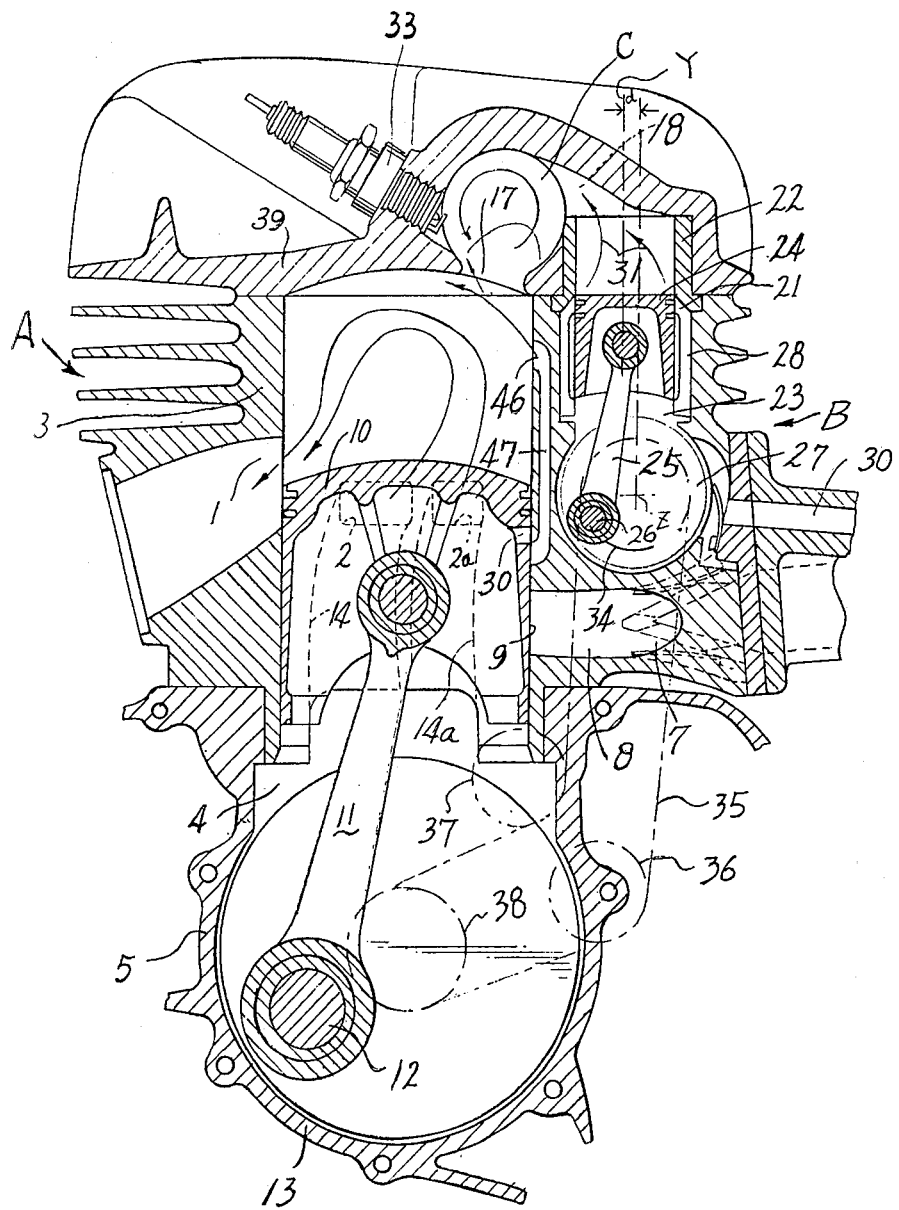
FIG. 2 shows a vertical cross-sectional view of another form of this invention.

With reference to FIGS. 1 and 2, the engine system of this invention will now be described in detail. In FIG. 1 there is shown a cross-sectional view of the basic form of this invention comprising first and second engines and a combustion chamber. A first two-cycle engine A has a first cylinder 3 with an exhaust port 1 and a pair of first scavenging ports 2 (only one of which is shown in FIG. 1) furnished in the wall thereof. Under said cylinder 3 is located a first crankcase 5 which includes a first crank chamber 4 with a first intake port 9 for supplying a lean air-fuel mixture (or air). A first piston 10 reciprocates inside said cylinder 3 to open and close the exhaust port 1 and scavenging ports 2. The piston 10 is connected to a first crankshaft 13 through a first crank pin 12 and a first connecting rod 11. A pair of first scavenging passages 14 connect the crank chamber 4 to the scavenging ports 2. An auxiliary scavenging passage 15 is furnished in a first intake passage 8 at a point downstream of a first reel valve 7 provided therein. The intake passage 8 for a lean mixture has a first throttle valve 6 and is open to said crank chamber 4.

A second engine B is mounted substantially in parallel with the first cylinder 3 and is adjacent to the upper portion of said cylinder at the opposite side of the exhaust port 1 and at the upper side of the first intake passage 8 of the first engine A. Engine B has a second cylinder 22 having a pair of second scavenging ports 21, a second crankcase chamber 23 positioned under the cylinder 22, and a second piston 24 reciprocating inside the cylinder. The second piston 24 is connected to a second crankshaft 27 through a second crank pin 26 and a second connecting rod 25. The second scavenging ports 21 are connected to the second crankcase chamber 23 through a pair of second scavenging passenges 28 (only one of which is shown in FIG. 1). A second intake passage 30 for a rich mixture has a second throttle valve 29 and a second reel valve 31, and is open to said crankcase chamber 23.

A combustion chamber C with an ignition plug 33 is mounted adjacent to the top portions of the first cylinder 3 and the second cylinder 22 so that it interconnects said first and second cylinders. The combustion chamber C is constructed as a spherical swirl chamber and is connected both to the inside of the first cylinder 3 through a wide and short passage 17 and to the inside of the second cylinder 22 through a passage 18. The second crankshaft 27 of the second engine B is connected (e.g., cooperatively coupled) to the first crankshaft 13 of engine A by toothed timing pulley 34, toothed timing belt 35, guide pulleys 36 and 37, and toothed timing pulley 38 so that pistons 10 and 24 reciprocate with approximately the same timing. The timing of the second engine may be retarded a little. In addition, the opening and closing timing of the scavenging ports 2 and 22 is set to be much the same. A first carburetor 19 is mounted to supply air at low load and a lean air-fuel mixture at high load in the intake passage 8 and a second carburetor 20 is mounted to provide a rich air-fuel mixture in the second intake passage 30. Only air may be drawn into the first crank chamber 4 at high load under the control of the valves 6 and 7.

The combustion chamber C in this invention improves the efficiency of the ignition and quick and effective burning of the fuel with a less amount of harmful components among exhaust gases. In this regard, the volume of combustion chamber C may preferably be large enough to allow the majority of the rich gas supplied through second cylinder 22 to remain in said combustion chamber for the subsequent combustion. More specifically, the preferred ratio of the volume of combustion chamber ($X_1$) to the total volume of $C_1$ and the volume of upper part 16 of first cylinder ($X_2$), or the volume left in the first cylinder 3 when the first piston 10 is at the top dead center, is given to meet the range of:

$$\frac{X_1}{X_1 + X_2} = 0.4 - 0.85$$

and most preferably the range of:

$$\frac{X_1}{X_1 + X_2} = 0.65 - 0.75$$

It is also preferable to provide a wide and short throttled passage 17 in combustion chamber C adjacent to the upper part 16 of the first cylinder 3 in order that the rich mixture more likely remains in said chamber C. For example, the chamber is more than hemispherical and tending toward being spherical, that is, the opening is toroidal rather than diametrical. It should be noted, however, that the size of the throttled passage 17, the cross-sectional area and the length of the passage 17, also concerns the power of the engine, and the size should be so settled as not to reduce the power. Further in this connection, to maintain an efficient ignition and quick burning, said combustion chamber C may preferably be shaped spherically so that an effective stratified swirl of the rich mixture and lean mixture is enabled. The rich mixture is closer to the wall having ignition plug 33 so ignition is more effective and reliable.

In order to make the construction simpler, it may be proposed that the first cylinder (sleeve) 3 is fixed to a common cylinder body 40 (for example, by an integral casting), while the second cylinder (sleeve) 22 is fixed to a common cylinder head 39 removable from said common cylinder body 40.

With respect to the running, a rich air-fuel mixture is sucked into the second crankcase 23 through the second intake passage 30 and the second reel valve 31 in a usual way for a two-cycle engine and the rich mixture can flow through the second scavenging passages 28 anad the scavenging ports 21 into the second cylinder 22 which can further flow into the combustion chamber C through the passage 18, while the combustion gas in the combustion chamber C can be pushed out into the first cylinder 3. In a similar manner, air or a lean air-fuel mixture can be sucked into the first crankcase 5 through the first intake passage 8 and the reel valve 7, which air or lean mixture can be transferred through the first scavenging passages 14, the first scavenging ports 2 and the auxiliary scavenging passage 15 into the first cylinder 3, while combustion gases can flow out of the first cylinder 3 through the exhaust passage 1. The adjustment and the relative coupling of the carburetors are such that always a comparatively rich mixture is fed to the second engine B, whereas only air or a comparatively lean mixture is fed to the first engine A. The adjustment may be chosen so that in the region of a low load or low numbers of revolution only air is fed to the first engine, whereas in the region of a high load or high numbers of revolution a comparatively lean mixture is fed to the first engine.

So the second engine B acts more or less as a pump by means of which substantially the biggest part of the fuel, mixed with air, is fed to the combustion chamber C, while scavenging is mainly done by means of the first engine A which supplies only air or lean mixture of air and fuel to the first cylinder.

During the upward stroke of the first and second pistons 10 and 24, the rich mixture from the second engine B and a part of air or lean mixture from the first engine A are compressed in the combustion chamber C to form a swirled and stratified charge with richer portion closer to the chamber wall. Ignition will take place about 20° before the first piston 10 has reached its topmost dead point. The mixture compressed in the combustion chamber C is ignited and as the first piston 17 moves back to its lowermost dead point, the burning gas in the combustion chamber C will flow out into the first cylinder 3, be mixed with air or lean mixture there and burns almost completely.

The first piston 10 will release the exhaust port 1 at a given instant so that the combustion gases can flow away. An effective scavenging of the first cylinder 3 is produced by the air or the comparatively lean mixture admitted through the scavenging passages 14 and 15. The comparatively rich mixture injected into the second cylinder 22 through the second scavenging passages 28 will push in front of it the combustion gases contained in the combustion chamber C towards the first cylinder 3 so that these combustion gases can also be conducted away in an effective manner through the exhaust port 1 of the first cylinder 3. Since the rich mixture from the second engine B has to cover a fairly long path before reaching the first cylinder 3, this rich mixture will not be conducted away through the exhaust port 1 and is left at least mainly in the combustion chamber C, in which the rich mixture is joined with the air or lean mixture from the first engine A and compressed during the next compression stroke to form a swirled and stratified charge with richer portion outside.

The embodiment of the two-cycle engine system according to the invention shown in FIG. 2 corresponds at least largely with the above-described first embodiment of the two-cycle engine system, and corresponding parts are, therefore, designated by the same reference numerals. In this embodiment, however, the axis Y of the second cylinder 22 is located closer to the first cylinder 3 than the axis Z of the second crankshaft 27, or the distance between the axis of the first cylinder 3 and the axis Y of the second cylinder 22 is smaller than the distance between the axis of the first cylinder 3 and the axis Z of the second crankshaft 27 by a distance $d$. Due to the eccentric arrangement of the second cylinder 22 with respect to the second crankshaft 27, a very compact construction of the engine system can be obtained as the second cylinder can be placed very close to the first engine. A further advantage of this arrangement is that the passage 18 between the second cylinder 22 and the combustion chamber C can be very short in order to obtain a higher performance.

In the second embodiment it is preferably proposed that an auxiliary scavenging port 46 coupled to the first crankcase 5 through a scavenging passage 47 in the cylinder wall and an opening 30 in the first cylinder, whereby the flow of a lean mixture from the auxiliary scavenging port 46 may decrease the pressure below the opening of the combustion chamber C, so that the burnt gases in said chamber C can likely be sucked into the upper part of first cylinder 3. Thus, the auxiliary scavenging port 46 will permit a more efficient scavenging.

As detailed in the foregoing, this invention improves ignition and combustion with a less amount of harmful components among the exhaust gases in a most compact construction by arranging two engines in parallel and a combustion chamber having an ignition plug which interconnects the two engines, wherein a rich mixture introduced in the second engine circulates into the combustion chamber for ignition and combustion, while a lean mixture supplied into the first engine scavenges the exhaust gases. Accordingly, the invention provides a long-wanted compact type two-cycle engine system with an improved pollution performance by utilizing the space above the intake passage of the first engine.

I claim:

1. A crankcase precompression type two-cycle engine system comprising:
   a crankcase precompression type first two-cycle engine including a first cylinder having, in the wall thereof, an exhaust port and at least one scavenging port, a first piston reciprocating in said cylinder to open and close said exhaust and scavenging ports, a first crankcase connected with said scavenging port through at least one scavenging passage and an intake passage to supply air or lean air-fuel mixture to said first crankcase;
   a crankcase precompression type second two-cycle engine, including a second cylinder mounted substantially in parallel with the first cylinder and having, in the wall thereof, at least one second scavenging port, a second piston reciprocating in said second cylinder to open and close said scavenging port therein, a second crankcase connected with said scavenging port in said second engine through at least one second scavenging passage, and a second intake passage to supply a rich air-fuel mixture to said second crankcase, said second piston being cooperatively coupled to said first piston so that said pistons move approximately at the same timing; and
   a combustion chamber provided with an ignition plug and positioned between the first and second engines, interconnecting the cylinders of said engines.

2. An engine system according to claim 1, wherein the second engine is positioned on the opposite side of the exhaust port of the first engine.

3. An engine system according to claim 1, wherein the second engine is positioned adjacent to the upper portion of said cylinder of the first engine at the upper side of said intake passage of the first engine.

4. An engine system according to claim 1, wherein said intake passage of the first engine is provided with a reel valve means.

5. An engine system according to claim 4, wherein said intake passage of the first engine is connected to an intake port open to the lower portion of the first cylinder.

6. An engine system according to claim 5, further comprising an auxiliary scavenging passage connected to said intake passage of the first engine at a point downstream of said reel valve means.

7. An engine system according to claim 1, wherein the combustion chamber is provided with a throttled passage as a part of said chamber being adjacent to the upper part of the first cylinder.

8. An engine system according to claim 1, wherein the combustion chamber is spherically shaped to expedite a swirl of the mixture.

9. An engine system according to claim 1, wherein the combustion chamber has such a volume enough to keep the majority of the rich mixture supplied therein.

10. An engine system according to claim 1, wherein the ratio of the volume of the combustion chamber ($X_1$) to the total volume of X, and the volume of the upper part of the first cylinder ($X_2$) when the piston being at the top dead center falls in the range of:

$$\frac{X_1}{X_1 + X_2} = 0.4 - 0.85.$$

11. An engine system according to claim 10, wherein the ratio falls in the range of:

$$\frac{X_1}{X_1 + X_2} = 0.65 - 0.75.$$

12. An engine system according to claim 1, wherein an auxiliary scavenging port communicated with the first crankcase by and through a scavenging passage is furnished in the cylinder wall of the first engine.

13. An engine system according to claim 1, wherein at least the top portion of said second cylinder is located closer to said first cylinder than the axis of the crankshaft of said second engine.

14. An engine system according to claim 1, wherein the axis of said second cylinder is located closer to said first cylinder than the axis of the crankshaft of said second engine.

15. An engine system according to claim 1, wherein said second engine is arranged adjacent to the upper portion of said first cylinder at the opposite side of the exhaust port and at the upper side of the intake passage of the first engine.

16. An engine system according to claim 15, wherein said first and second cylinders are formed in a common cylinder body.

17. An engine system according to claim 1, wherein said intake passage of the second engine is provided with a carburetor to supply the rich air-fuel mixture.

18. An engine system according to claim 17, wherein said intake passage of the first engine is provided with a carburetor to supply the air or the lean air-fuel mixture.

* * * * *